United States Patent
Keinänen et al.

[11] Patent Number: 6,149,715
[45] Date of Patent: Nov. 21, 2000

[54] METHOD FOR SCRUBBING GASES

[75] Inventors: Veli Keinänen, Tornio; Launo Lilja, Pori; Pekka Niemelä; Janne Ollila, both of Tornio, all of Finland

[73] Assignee: Outokumpu OYJ, Finland

[21] Appl. No.: 09/526,936

[22] Filed: Mar. 16, 2000

Related U.S. Application Data

[62] Division of application No. 09/134,580, Aug. 14, 1998.

[30] Foreign Application Priority Data

Aug. 29, 1997 [FI] Finland .................................. 973567

[51] Int. Cl.$^7$ .................................................. B01D 47/10
[52] U.S. Cl. .............................. 95/219; 55/309; 95/224; 261/79.2; 261/DIG. 54
[58] Field of Search ........................... 95/216, 219, 221, 95/223, 224, 230, 271; 96/275, 311, 277, 312, 313, 314, 228, 316; 55/309, 312; 261/21, 22, 115–118, 79.2, DIG. 9, DIG. 54

[56] References Cited

U.S. PATENT DOCUMENTS

| | | | |
|---|---|---|---|
| 2,127,571 | 8/1938 | Pardee, Jr. .............................. | 95/224 X |
| 2,604,185 | 7/1952 | Johnstone et al. ........................ | 95/219 |
| 2,696,275 | 12/1954 | Pring ......................................... | 96/316 |
| 3,456,928 | 7/1969 | Selway ...................................... | 261/22 |
| 3,490,204 | 1/1970 | Kalika ...................................... | 261/22 X |
| 3,780,499 | 12/1973 | Dorr et al. ................................ | 95/224 X |
| 3,927,986 | 12/1975 | Ishikawa et al. ................ | 261/DIG. 54 |
| 4,023,938 | 5/1977 | Guth et al. ............................... | 95/224 X |
| 4,272,499 | 6/1981 | Cason et al. ........................ | 261/116 X |
| 4,734,109 | 3/1988 | Cox ....................................... | 261/79.2 X |
| 5,178,653 | 1/1993 | Lilja et al. ............................... | 96/312 |

FOREIGN PATENT DOCUMENTS

| | | |
|---|---|---|
| 76701 | 1/1987 | Finland . |
| 2452311 | 10/1980 | France . |

OTHER PUBLICATIONS

H. Bauer, Y.B.G. Varma, "Air Pollution Control Equipment", Springer–Verlag, 1981; Preface and pp. 219–239.
W. Strauss, "Industrial Gas Cleaning", Pergamon Press, 1975 Table of Contents.

*Primary Examiner*—Richard L. Chiesa
*Attorney, Agent, or Firm*—Morgan & Finnegan, L.L.P.

[57] ABSTRACT

The invention relates to a method according to which the wet scrubbing of a gas flow is performed in at least three, advantageously six successive steps or phases, and the droplet separation of the scrubbed gases is carried out in a uniform cyclone-like droplet separator composed of several nested cylinders. The invention also relates to a method for momentarily bypassing, during a capacity rise, a scrubbing phase that causes pressure loss. As a result, there is obtained a clean and dropless gas that falls below the allowed dust content limits and can thus be either conducted to combustion or discharged in the open air. The invention also relates to an apparatus, a multiphase scrubber, for realizing the method. The invention is particularly suited to be used for scrubbing hot furnace gases from closed reduction furnaces, where said furnace gases contain easily inflammable components.

4 Claims, 3 Drawing Sheets

METHOD FOR SCRUBBING GASES

This is a divisional of co-pending application Ser. No. 09/134,580, filed Aug. 14,1998.

The present invention relates to a method according to which the wet scrubbing of a gas flow is carried out in at least three, advantageously six successive steps or phases, and the droplet separation of the scrubbed gases is performed in a cyclone-like uniform droplet separator composed of several nested cylinders. The invention also relates to a method for momentarily bypassing, during a capacity rise, one scrubbing phase that causes pressure loss. The obtained result is a clean and dropless gas that falls below the allowed dust content limits and can be either burned or conducted to the open air. The invention also relates to an apparatus, i.e. a multiphase scrubber, for realizing said method. The invention is particularly suited to be used for cleaning the hot furnace gases from closed reduction furnaces, where said furnace gases contain easily inflammable components.

As the legislation dealing with environmental protection is tightened, the requirements set for the cleaning of exhaust gases are continuously becoming stricter. Also the use of various energy sources has become more and more critical, wherefore it is more recommendable to use the fuel released from a process, for instance CO gas, as fuel proper, rather than let it flow unused to the open air. The basic requirement for such usage of gas is that the gas is clean. In particular the cleaning of gases concerns industry, and it may even become a threshold issue with respect to the continuity of production. This also means that more and more enterprises will invest in gas scrubbing, both in research, development and production, as well as to related purchases.

An ideal solution in the case of a wet scrubber is a combined scrubber and droplet separator unit, whereto the exhaust gases can be separately conducted and removed in an ideal case directly to the open air, or, as regards fuel, directly to combustion.

Thus the scrubbing of gases can in a normal case be divided into two phases, to the scrubbing operation proper and to droplet separation thereafter. What is the ideal type of scrubber in each case depends a lot on the scrubbing principles and requirements. The same applies to the droplet separator.

A popular scrubber principle is the venturi principle. In practice these include two different types. The other uses a water jet to render power and energy to the scrubbing operation. In that case the jet simultaneously serves as a kind of blaster and extractor. According to another principle, the gas itself is the power-bringing element, wherefore the gas must be pressurized. In this specification we refer to the water-jet operated venturi by using the abbreviation WG scrubber element, and to the second, gas operated venturi by using the abbreviation GW scrubber element.

Detailed descriptions of both of the above mentioned scrubber types are found in the literature, for instance in the following references: (1) H. Bauer, Y. B. G. Varma: "Air pollution Control Equipment", Springer-Verlag, 1981 and (2) W. Strauss: "Industrial Gas Cleaning", Pergamon Press, 1975.

In venturi scrubbers, like in other scrubber types, one of the problems is caused by fluctuations in the capacity. In the patent publication FR 2,452,311, there is introduced an embodiment where an annular water layer forms in the venturi throat a collar for restricting the gas flow. It is easy to react to a change in the capacity by adjusting the thickness of the water layer.

The centrifugal force can also be utilized in scrubbers. A wet cyclone based on this principle is described, among others, in the U.S. patent publication No. 2,696,275 and on page 374 of reference (2), where a centrifugal wet scrubber, or a turbulence phenomenon created by means of baffle plates, is described.

The U.S. patent publication No. 3,456,928 describes a scrubber based on a blasting effect, where the gas flow is allowed to be blasted onto the surface of the water accumulated on the scrubber bottom.

Different types of droplet separators are described, among others, on pages 219–239 of reference (1). The main types of droplet separators are based on a zigzagging channel principle, on the centrifugal force principle or on the classic filter principle.

According to the U.S. Pat. No. 5,178,653, the gas or gases to be scrubbed are conducted to at least three vertical scrubber tubes, and after the scrubber tubes, the gases are conducted to a uniform droplet separator composed of several nested cylinders, in which droplet separator the gases are forced into turbulent motion, and a clean and dropless gas is discharged through an exhaust pipe located in the middle of the scrubber tubes.

According to the present invention, the gases to be scrubbed, particularly hot furnace gas that contains an easily inflammable component, is first conducted into an essentially vertical WG scrubber element, where the major part of the solid particles contained in the gas, mainly the coarsest particles, is separated into the scrubbing liquid. From here, the precleaned gas is conducted to a mainly vertical GW scrubber element which removes the fine part of the particles. Thereafter the almost cleaned gas is conducted to a substantially horizontal WG scrubber element, which at the same time serves as the inlet for a cyclone-like droplet separator. The central tube of the droplet separator also serves as the scrubber exhaust pipe. Moreover, the invention essentially includes a bypass member enabling the bypassing of the GW scrubber element that requires gas pressure; said bypassing is needed in the case of a momentary rise in the capacity and likewise a rise in the pressure loss. The essential novel features of the invention are apparent from the appended claims.

When producing for instance ferrochromium, the exhaust gas of the electric arc furnace contains over 80% carbon monoxide (CO), and cleaned carbon monoxide is an excellent fuel. Among the requirements for the operation of this type of gas scrubber, let us point out first of all that it must be sealed so that gas does not leak out to the environment, because carbon monoxide is poisonous; however, leakage towards the inside is not allowed either, because it dilutes the gas. Secondly, the scrubber must be effectively cooled, and sparkling or the like must not occur, because the gas is easily inflammable; and thirdly, a good dust and droplet separation is naturally required of the scrubber. In connection with the diluting and possible sparkling of CO gas, it should be observed that the explosion range of carbon monoxide is 12–75% by volume of carbon monoxide in the air. In order to fulfill the above enlisted requirements, the scrubber must in most cases be free of moving parts and gas-collecting cavities, and advantageously it means that strong scrubbing liquid jets in the WG scrubber element produce a sufficient amount of energy that overcomes the pressure losses in the scrubber. In most cases the employed scrubbing liquid is water, but scrubbing chemicals can also be added. For the benefit of simplicity, we mostly refer to water in the present specification, but this does not exclude the use of other liquids.

The present invention consists of several naturally linked steps or phases known as such; this also has given the name for the apparatus: multiphase scrubber, MPS. Advantageously but not necessarily the first phase consists of prewetting in the scrubber inlet tube, which has two aims: to lower the temperature and to create nuclei for the fine dust. The first phase proper of the method according to the invention is the scrubbing of gas coming out of the furnace in the vertical WG scrubbing phase. In this phase, the furnace exhaust gas is accelerated, by means of a high-pressure water jet, advantageously within the range of 20–40 bar, so that the gas is simultaneously cooled and the major part of the solid particles contained therein are separated to the water droplets.

From the WG scrubbing phase, the gas containing dust and water droplets is allowed to collide to the water surface located underneath the venturi, and this in a way constitutes the second scrubbing phase, the injection scrubbing. In this phase, the inertial force is, owing to the fairly high gas velocity, so high that the gas partly penetrates into the water and thereafter change its course. Now the water contained as droplets in the gas, as well as the mainly coarser solid particles bound to said droplets are left in the water present in the injection tank, and the cleaned gas continues to flow towards the next scrubbing phase.

Owing to the energy charge in the water jet, the so-called main jet, of the first WG scrubbing phase, the gas has so much pressure that it suffices in the next GW scrubbing phase. In this phase, the gases are conducted through the venturi, where it is accelerated to a velocity of 40–150 m/s, depending on the strength of the pressure charge. Into the venturi throat of the scrubber, there is dropped in the gas a reasonable amount of water, at a pressure remarkably lower than in the first scrubbing phase (WG); even a normal pipeline pressure suffices. Also the water quantity is remarkably smaller than the quantity used in the first scrubbing phase. As is apparent from the literature, this GW scrubbing is more effective in separating small particles from the gas flow than the WG scrubbing. The literature of the field maintains that the limit grain size in WG scrubbing is of the order 0.6–0.9 $\mu$m, and in GW scrubbing of the order <0.1–0.4 $\mu$m.

After GW scrubbing, the gas bound in the water droplets during the scrubbing and containing fine dust particles is allowed to be injected onto the water surface in the tank located underneath the venturi tube, so that the water droplets and the dust particles are left on the water surface. The gas that is now almost cleaned after said scrubbing phase, i.e. the injection scrubbing, which in a way is a fourth scrubbing phase, is then extracted and reaccelerated to a high speed by the mainly horizontal WG ejector. At the same time, a fifth scrubbing phase, i.e. a new WG scrubbing, is carried out in the ejector. Simultaneously the ejector serves as an inlet into the last or sixth scrubbing phase, which is based on the centrifugal force and at the same time serves as the droplet separator. The particles that are blasted onto the droplet separator walls during the scrubbing are made to stick onto the walls and then conducted onto the separator bottom by using internal flushing with water therein. Advantageously also the venturi scrubber of the first WG scrubbing phase has internal flushing.

There are situations when the gas quantity passing through the scrubber must momentarily be increased, and as a result the pressure loss in the scrubber rises higher than the energy charge which the scrubbing liquid jets of the WG scrubber elements can render. This kind of a situation is created for instance in a electric arc furnace where there are normally two or more scrubbers arranged in parallel. Sometimes there also arises a situation where one of the scrubbers must be cleaned, repaired etc. From the point of view of production, it is in such cases advantageous not to interrupt the whole process. In these cases the gas scrubbing is generally carried out so that during said reparations, the gases from the scrubber that is momentarily out of use are conducted through another scrubber/scrubbers. However, the scrubbers have a determined capacity range where they operate optimally, and it is not advisable to design said capacity range so that it is still at its optimum when a double amount of gas is fed therethrough.

During capacity peaks, the pressure loss in the scrubber rises, and the scrubber cannot be run with a normal water jet. The most critical points are the GW scrubbing phases, because when the amount of gas to be scrubbed is large enough energy cannot be stored therein in order to achieve a good scrubbing result also in the GW phase. For this purpose, the present invention is provided with a bypass tube, whereby the pressure-demanding GW scrubbing phase can be momentarily bypassed.

The requirement for a sealed apparatus means that the gas locks must be unblocked and still simple in construction. This type of a structure is illustrated for example in the Fl patent publication 76,701.

BRIEF DESCRIPTION OF THE DRAWINGS

The invention is described in more detail with reference to the appended drawings, where.

DETAILED DESCRIPTION OF THE INVENTION

Figure 1:
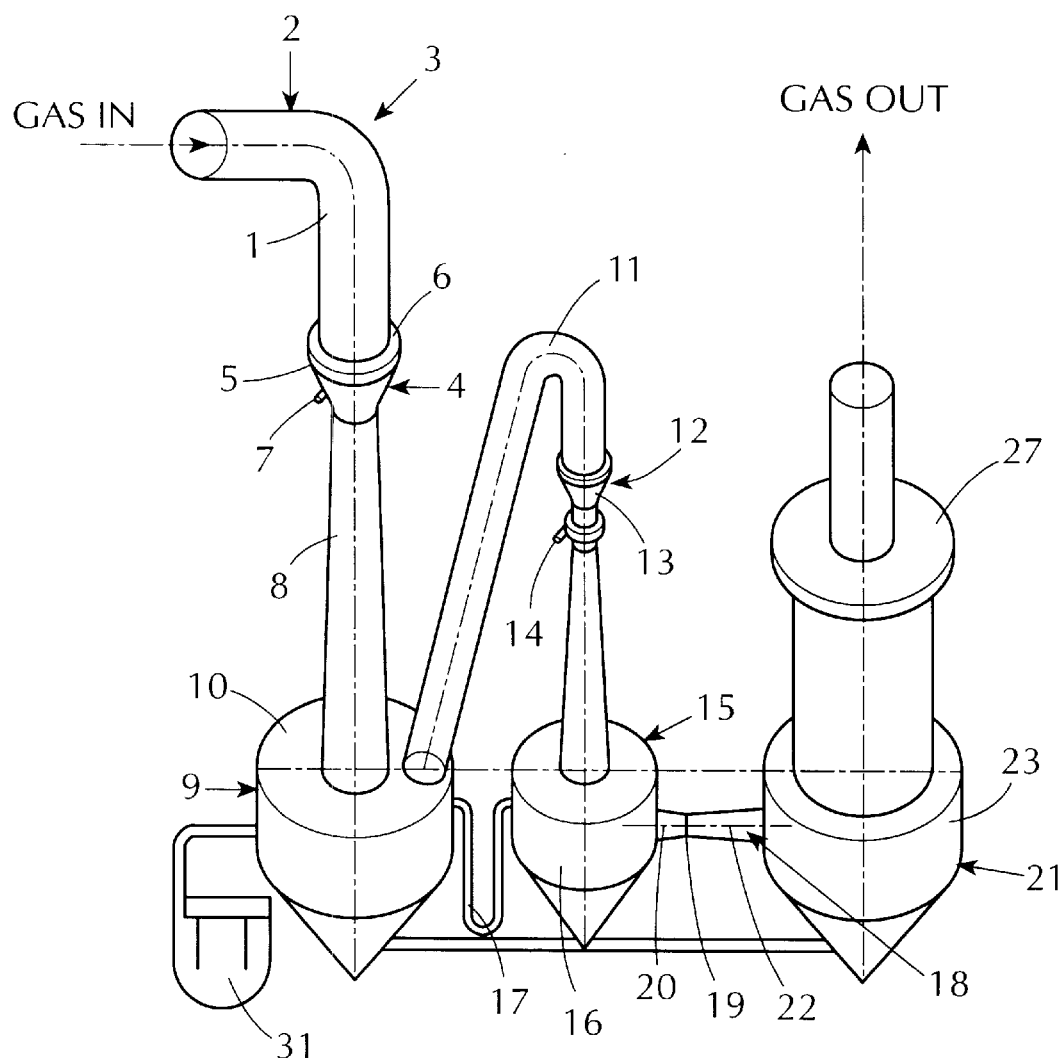
FIG. 1 illustrates the general principle of the scrubber embodiment according to the present invention, including six separate and successive scrubbing phases, the last of which at the same time serves as the droplet separator, FIGS. 2a and 2b further illustrate a diagram of the essential characteristic parts of the invention, seen both from the side (a) and from the top (b)

In the scrubber embodiment according to FIG. 1, it is seen that the gas to be scrubbed, mainly hot furnace gas (within the temperature range of 800–1,200° C.), is directed to flow directly downwards from the furnace unit in a scrubber inlet tube 1. In the inlet tube, the gas is subjected to prewetting 3 by water jets through nozzles 2, which results in a partial reduction in the gas temperature and in a formation of nuclei that enhances the separation of small solid particles.

Thereafter the gas enters the WG scrubber element 4 or the WG venturi 5 (scrubbing phase 1). The internal flushing of the venturi 5 takes place with flushing water coming through nozzles 6, so that said flushing water flows down along the inner venturi wall. By means of the main water jet, which is set in a turbulent circulation in a high-pressure nozzle 7 and thus made to expand in a controlled fashion, the furnace gas is accelerated to the desired speed and set in a turbulent state. The speed of the accelerated gas is dropped to a reasonable level in the discharge cone 8 of the venturi. From here, the gas jet containing dust particles bound in water droplets is directed to the scrubbing phase 9 based on collision (scrubbing phase 11), which takes place in the lower tank 10 located underneath the venturi; in this tank, said particles are separated from the gas into the water.

From the scrubbing phase 9, the gas continues to flow through the uptake pipe 11 to the next GW scrubbing phase 12 (scrubbing phase III), where the throttling rate of the GW venturi 13 is such that thereby the gas is accelerated to a speed which is 2–8 times higher than its speed in the WG venturi 5, i.e. to a speed of 40–150 m/s, so that the transversal area of the venturi throat is reduced to a range of ½–¼ of the transversal area of the transfer pipe 11. Thus the speed difference which is important in the scrubbing operation is achieved in an excellent fashion, because the scrubbing liquid coming to the venturi scrubbing through the nozzles 14 is fed in a perpendicular direction in relation to the gas flow, in which case the speed of the liquid is of the order zero. After the GW venturi, a similar type of injection scrubbing as in phase 9 is continued in phase 15 (scrubbing phase IV). No the small particles that were separated from the gas to the scrubbing liquid are left in the washing water contained in the lower tank 16.

If the gas pressure is not sufficient for the GW scrubbing phase, the GW venturi can be temporarily bypassed according to the present invention, so that the gas is conducted via a bypass tube 17 to flow from the scrubbing phase 9 directly to the scrubbing phase 15, i.e. from the lower tank 10 to the lower tank 16. This type of on/off adjustment is necessary, because the furnace cannot be regulated by means of some external system of adjusting register plates or the like, due to dangerous leakage flows.

In the scrubbing phase 15, the major part of the small particles are already separated from the gases, and thereafter the gas is conducted to a new WG scrubber element 18 (scrubbing phase V), where the gas that is cleaned for the major part is reaccelerated by means of a WG ejector 19 placed in the scrubbing part in an essentially horizontal position. In this phase, the gas is scrubbed by means of a water jet discharged through nozzles 20, and the speed of said jet is higher than the gas speed. At the same time, the ejector 19 serves as an inlet to the last cyclone-like scrubbing and droplet separation phase 21 (scrubbing phase VI).

Figure 2A:
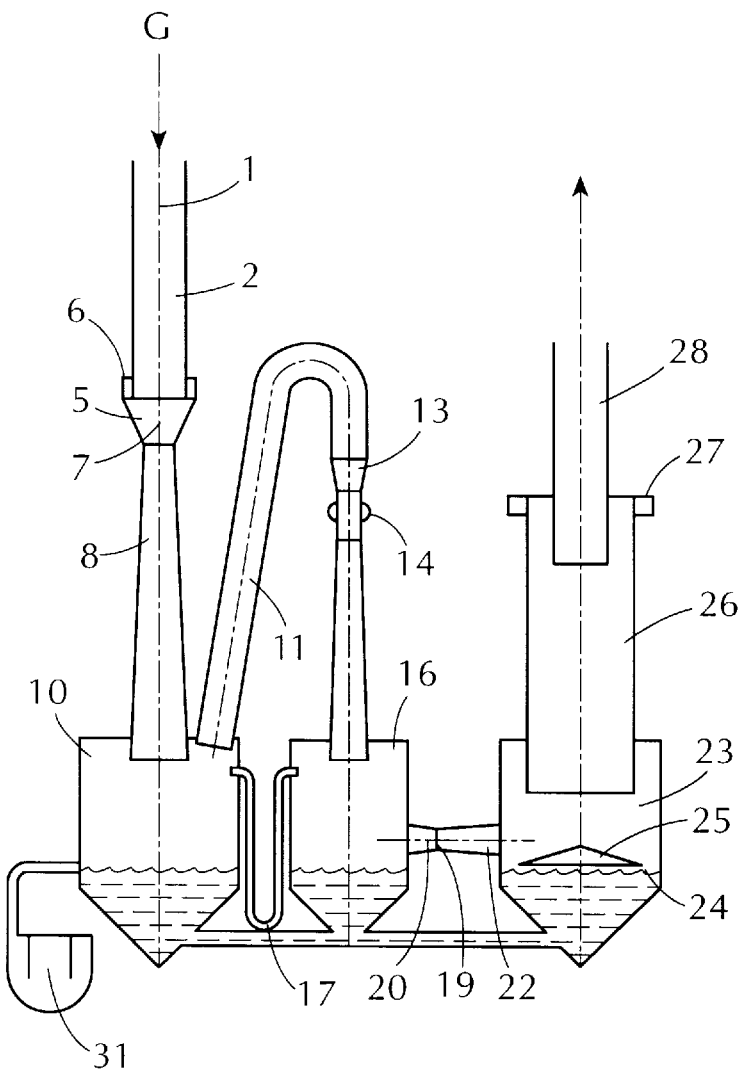

The gas is fed in a tangential fashion via the discharge cone 22 of the ejector, first to the reception and water collecting tank 23 of the last scrubbing and droplet separation phase 21, where, as is seen in FIG. 2a, in the middle of the tank, above the water surface level 24, there is provided a whirl cone 25. To the upper part of the tank, there is connected a whirl chamber 26, which is smaller than the tank diameter, and where the gas is set in a vigorous whirling motion. From the top part of the whirl chamber, flushing water is flown along the inside of the tank through nozzles 27; at the same time said flushing water serves as a surface receiving dust particles and discharging them to the collecting tank 23. From the scrubbing and droplet separation phase 21, the gas is exhausted as cleaned and droplet-free to further usage, mainly to be used as a gaseous fuel CO via an exhaust channel 28. The water tanks of the separate phases are interconnected in a known fashion in order to tap the water.

Figure 2B:
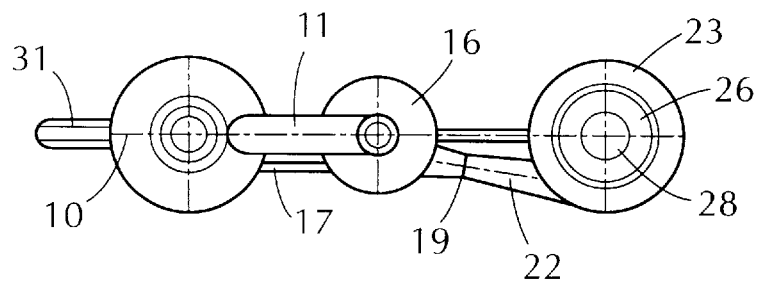

FIG. 2b shows in particular how the discharge cone 22 of the ejector leading to the droplet separator is placed tangentially with respect to the water collecting tank 23.

Figure 3:
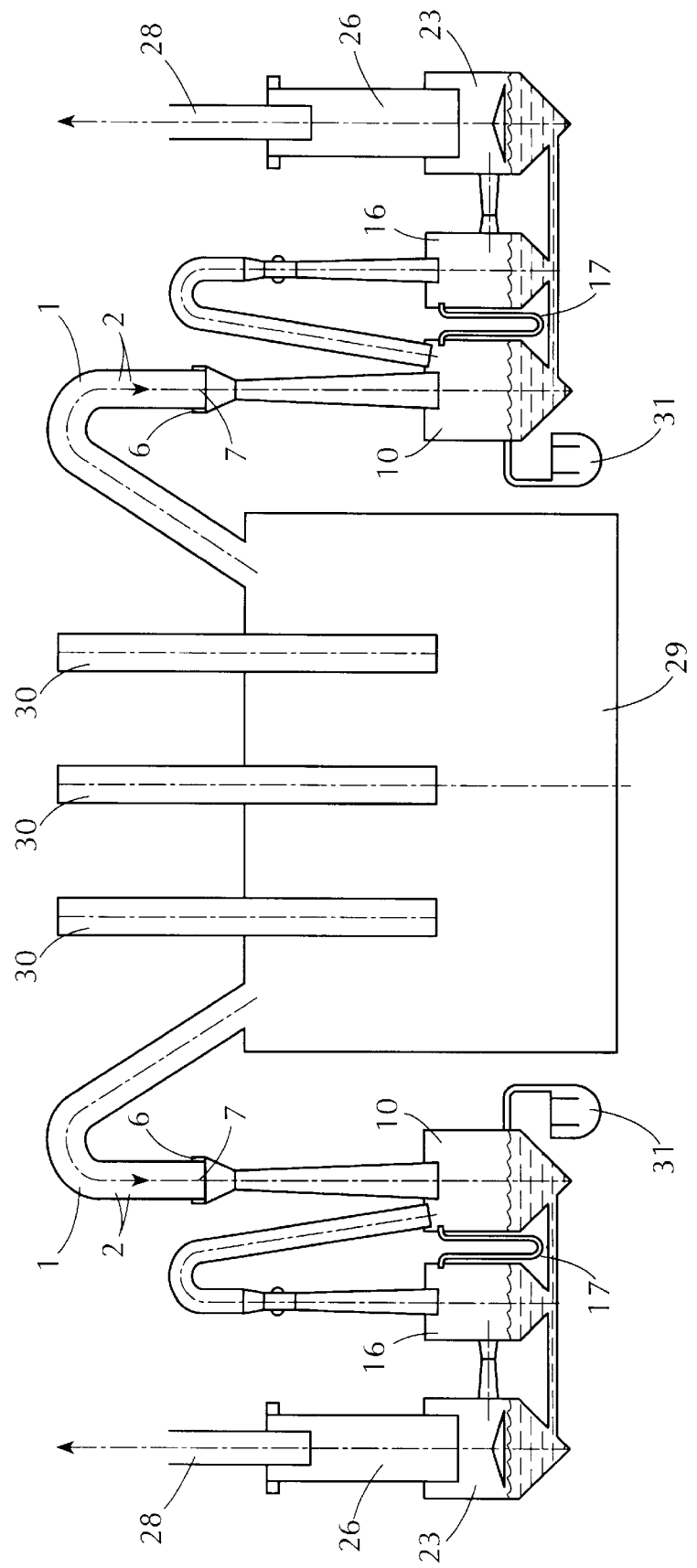
FIG. 3 is a diagram of a process where the invention constitutes a part, i.e. of a electric arc furnace connected to the production of ferrochromium.

FIG. 3 illustrates a electric arc furnace 29 used in the smelting of ferrochromium; in said furnace, electrodes 30 are used for heating the charge. The gases coming from the electric arc furnace into scrubbing are conducted to scrubbers via discharge pipes 1 arranged symmetrically in the scrubbers. The scrubbed gas that has gone through the scrubbing unit is conducted to further usage via an exhaust channel 28. The drawing also shows a special gas lock 31 that receives the gas pressure in the scrubbers; said gas lock has two additional features, i.e. the lock is immediately refilled, if the pressure momentarily surpasses the preset limit, and it is not blocked by sediments carried along in the water.

As was explained above, the invention includes at least three essential phases: first a WG scrubbing with a venturi scrubber (I), secondly a GW scrubbing with a venturi scrubber (III) and as the third phase, a WG scrubbing with an ejector (V). In these scrubbing phases, gases are scrubbed with a scrubbing liquid, and as a result the solid particles are separated from the gas into the scrubbing liquid. It also is advantageous that the gas scrubbing includes, after each above described scrubbing phase, a scrubbing phase where the particles separated to the scrubbing liquid droplets are washed away from the gases by conducting the gases against a liquid surface and by making them partly penetrate said surface (II, IV, VI). If the gas quantity in the scrubber momentarily rises above the quantity that the scrubber was designed for, the GW scrubbing phase that requires a high pressure can be switched off, and the gases can be conducted, via a bypass member, directly to the following scrubbing phase.

Although most of the stages in this multiphase or multi step scrubbing process are previously known, we are not aware that combinations of the above kind should be known in the prior art. By means of said combinations, there can be achieved a clean gas where the amount of both finely divided and coarser solid particles is small, in addition to this, by means of the embodiment of the invention, it is possible to momentarily deal with such gas quantities that are larger than the optimum range for the scrubber arrangement.

The invention is further described with reference to the appended examples.

EXAMPLE 1

For scrubbing exhaust gases from a electric arc furnace used in the production of ferrochromium, there are available two scrubber units, scrubber A and scrubber B. According to the prior art practice, the scrubber included the following scrubbing phases: WG scrubbing, injection scrubbing and cyclone scrubbing. The furnace dust separated as a result of these scrubbing phases is relatively coarse, and its quantity is <50 mg/m$^3$ solids in the gas. With an active power of 30 MW. the pressure after the scrubber was of the order 4 kPa.

EXAMPLE 2

To the above described scrubbers, there was added another WG scrubbing phase, i.e. the scrubbers included the following scrubbing phases: WG scrubbing, injection scrubbing, WG scrubbing and a cyclone scrubbing phase. After this adjustment, the pressure after the scrubbers was increased up to 5.5–5.8 kPa. The quantity of solids contained in the gas was of the same order as above.

EXAMPLE 3

The grain size of the dust carried along with the gas was changed to more finely divided than before, so that there was a radical drop in the separation capacity as compared to the earlier rate. The dust content in the gas was raised even up to 200–300 mg/m$^3$. As a solution, there was developed a new phase in the scrubber arrangement; this new phase was the GW scrubbing. Said addition was realized only in the scrubber B, while the scrubber A remained as before. Now the scrubber B included the following phases: WG scrubbing, injection scrubbing, GW scrubbing, WG scrubbing and the cyclone scrubbing phase. Thereafter the pressure, in succession to the scrubber B, was dropped to 2–3 kPa, and the dust content was dropped to <30 mg/m³. The particle size in the exhaust gas after the scrubber is extremely small, even 70% below 1μm. As for the scrubber A, the pressure remained at 5–6 kPa. The scrubber conditions are also represented in the following table.

TABLE

|  |  |  | Scrubber A | Scrubber B |
|---|---|---|---|---|
| Gas quantity | $V_{INn}$ | m³/h | 4,800 | 3,700 |
| Gas temperature after scrubber | $Tg_{OUT}$ | ° C. | 6 | 6 |
| Solids content after scrubber | $C_{OUT}$ | mg/m³ | >190 | 24 |
| Pressure after scrubber | $\Delta P_{OUT}$ | kPa | 5.9 | 2.7 |

The nozzle pressures in the WG scrubbing phases were over 30 bar, and in the GW scrubbing phase about 4 bar. The CO content of the gas to be scrubbed was 84%. Otherwise all functions followed the principles set forth in the above specification.

EXAMPLE 4

In the scrubber A, there were realized the same alterations as in the scrubber B of example 3, and thereafter the dust content in the scrubber A was likewise dropped to the same level as in the scrubber B described in example 3, and the scrubber pressures were correctly adjusted. The scrubbers were also provided with a bypass channel operating according to a water lock principle; said bypass channel was first installed in the scrubber B. Prior to the installation of the bypass channel, the conducting of the whole gas quantity via the scrubber B failed, owing to a pressure loss that had risen too high. Via the scrubber A, on the other hand, an occasional feeding of the whole gas quantity succeeded without the pressure after the scrubber dropping too low. After the installation of the bypass channel, the conducting of gases also via the scrubber B succeeded, and the gas pressure after the scrubber was of the order 2 kPa, which is a sufficient rate for a good operation of the scrubber.

What is claimed is:

1. A method for scrubbing gases by wet scrubbing in several different phases, characterized in that the gases are scrubbed in at least three phases, so that in the first WG scrubbing phase (4), the gases are conducted to a scrubber (5), where the speed of a scrubbing liquid to be sprayed in the gases is many times higher than the gas speed, so that the major part of coarser particles contained in the gases are separated into the scrubbing liquid; in the second GW scrubbing phase (12) taking place in another scrubber (13), the speed of the gases to be scrubbed is 2–8 times higher than that of the scrubbing liquid, and the third scrubbing phase is a WG scrubbing phase (18) of the same type as the first, whereafter the gases are finally conducted tangentially to a scrubbing and droplet separation phase (21), wherefrom the cleaned gases are exhausted, and that the GW scrubbing phase (12) can momentarily be bypassed.

2. A method according to claim 1, characterized in that in between the first WG scrubbing phase (4) and the GW scrubbing phase (12), there is added a scrubbing phase (9), where the major part of the coarse particles contained in the gases are separated to the scrubbing liquid, and that in between the GW scrubbing phase (12) and the third, WG scrubbing phase (18), there is added a scrubbing phase (15), where the major part of the fine particles contained in the gases is separated to the scrubbing liquid.

3. A method according to claim 1 or 2, characterized in that the scrubbing phase (9) that comes after the first WG scrubbing phase (4) and separates the coarse particles is connected, via intermediation of a bypass tube (17), to the scrubbing phase (15) separating the fine particles and located prior to the last WG scrubbing phase, in order to bypass the GW scrubbing phase (12).

4. A method according to claim 1, characterized in that the gases to be scrubbed are subjected to prewetting (3) with liquid jets prior to feeding the gases to the first WG scrubbing phase (4).

* * * * *